(12) United States Patent
DeMontmorency

(10) Patent No.: US 8,591,178 B2
(45) Date of Patent: Nov. 26, 2013

(54) VERY LOW HEAD PACKAGED SMALL HYDRO STATION

(76) Inventor: David George DeMontmorency, Cambridge (CA)

(*) Notice: Subject to any disclaimer, the term of this patent is extended or adjusted under 35 U.S.C. 154(b) by 500 days.

(21) Appl. No.: 13/024,450

(22) Filed: Feb. 10, 2011

(65) Prior Publication Data

US 2011/0194927 A1 Aug. 11, 2011

(30) Foreign Application Priority Data

Feb. 10, 2010 (GB) .................................. 1002241.6

(51) Int. Cl.
*F04D 29/70* (2006.01)
(52) U.S. Cl.
USPC ...................................................... 415/121.2
(58) Field of Classification Search
USPC .................................... 416/247 R; 415/121.2
See application file for complete search history.

(56) References Cited

U.S. PATENT DOCUMENTS

| 4,288,985 A | 9/1981 | Dyck |
| 4,311,410 A * | 1/1982 | Gutierrez Atencio .......... 405/78 |
| 4,364,228 A | 12/1982 | Eller |
| 2010/0013232 A1 | 1/2010 | Prigent |

FOREIGN PATENT DOCUMENTS

| JP | 1253570 | 10/1989 |
| JP | 2002295357 | 10/2002 |

OTHER PUBLICATIONS

Features for Optimising a Pico Hydro System for Telecommunications Base Station in Developing Countries, Feb. 19, 2010.

* cited by examiner

*Primary Examiner* — Richard Edgar
(74) *Attorney, Agent, or Firm* — Anthony Asquith Corp

(57) ABSTRACT

The water-turbine and the intake- and exit-tubes are located in a house, which is supported on stilts from the bed of the headpond. In operation, water is siphoned upwards out of the headpond through the open underside of the house. A trashrack is located in the intake-tube, above the water level of the headpond, whereby the trashrack is in air when the turbine is not running. The trashrack is horizontal.

17 Claims, 5 Drawing Sheets

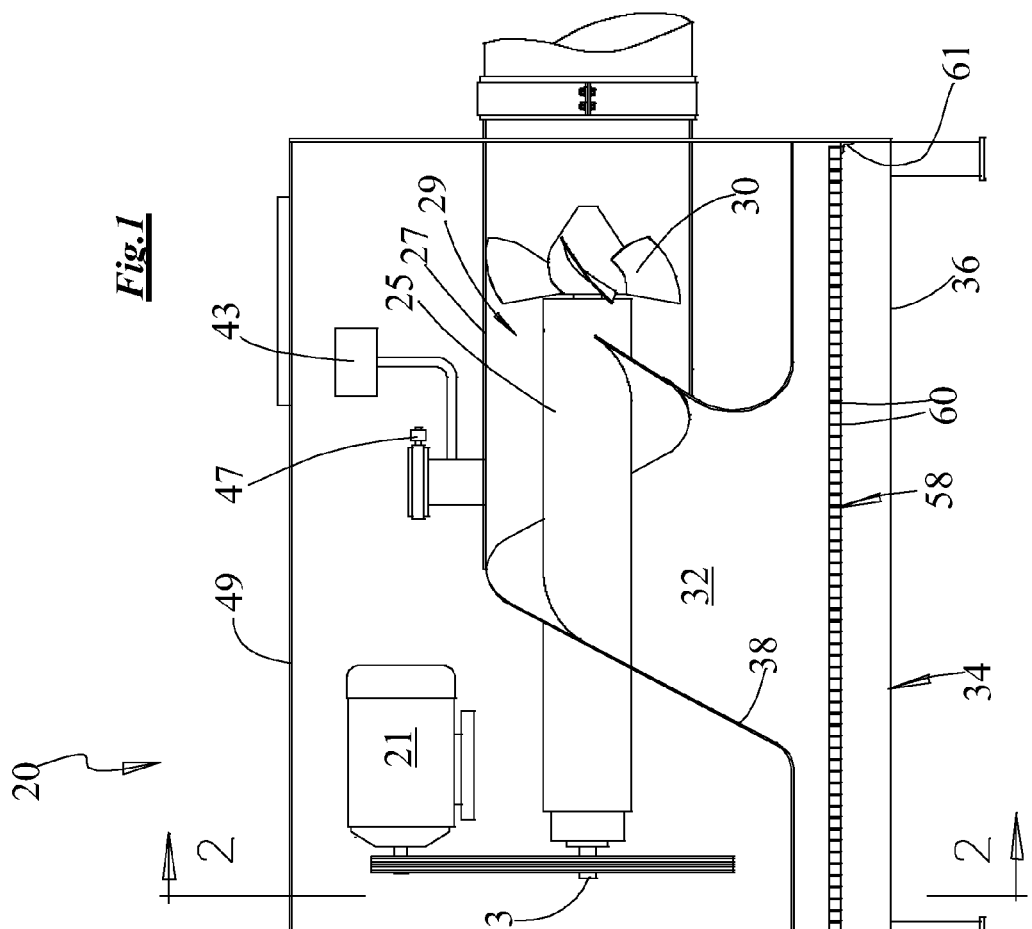
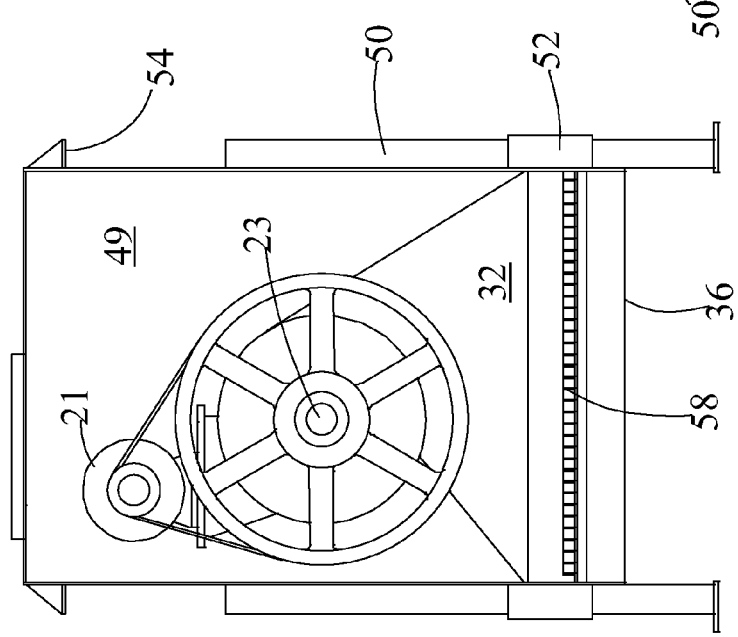

VERY LOW HEAD PACKAGED SMALL HYDRO STATION

This technology relates to a small hydro-electric power plant, of the kind that can be used to produce electrical energy at the rate of e.g a hundred kilowatts, from a stream or river in which the available hydraulic head is between one meter and eight meters.

One of the ways a small power plant can be made economical is to take the water out of the headpond on a siphon basis, so that the working parts of the station are above the headpond water-level. That principle is followed in the designs depicted herein.

One difficulty, in a siphon-based plant, if the plant were to be operating on less than one meter head, would be to ensure a sufficient velocity in the tail-pipe from the turbine to carry the air that is entrained in the exit-water down to the tailpond. That is to say, in a siphon-based water-conveying system, operating on a head of less than one meter, the air would or might quickly collect in and around the turbine itself, with disadvantageous effects on efficiency. In fact, often, it is only possible to avoid these problems when the head is more than two meters.

If the head were more than eight meters, the suction in the exit-tube would then be so high that problems associated with cavitation in the turbine blades would be expected.

An aim of the technology is to provide an inexpensive system for extracting electrical power from rivers and streams where there is a head of one or two to eight meters, over a reasonably short distance, such as may be found at dams, canals, low waterfalls, river rapids, and the like.

When considering the economics of low-head hydro-electric power stations, some of the traditional difficulties may be described as follows.

One problem is the high relative cost of the associated civil engineering works, including providing a deep headpond upstream of the turbine. Traditionally, the headpond has been deep, in order that water can be drawn into the intake-mouth of the intake-tube at a substantial depth below the water surface. Of course, a trash-screen or trashrack is provided, but still, traditionally, the trashrack is located at a depth to which the floating debris does not go, in order to minimize the amount of debris that might be sucked into the turbine, and also to keep the trashrack from icing up in winter. Clearing and cleaning the trashrack can be a major service expense. Generally, in the prior art, the trashrack has been disposed vertically, and the water in the headpond has had to be deep.

Another problem is that fish can suffer biological damage when passing through spinning turbines. The faster the rotation of the turbine, the greater the damage. However, in a low-head station, the velocity of water through the blades is slow, and the rpm of the turbine rotor is slow, compared with other turbine configurations. Both of these features serve to reduce fish damage.

The present technology aims to provide an economical and trouble-free siphon-based hydro-electric generating station, in which these problems are alleviated.

DETAILED DESCRIPTION OF PREFERRED EMBODIMENTS

The technology will now be further described with reference to the accompanying drawings, in which:

FIG. 1 is a side-elevation of a hydro-electric plant.

FIG. 2 is a view on line 2-2 of FIG. 1.

Figure 3:
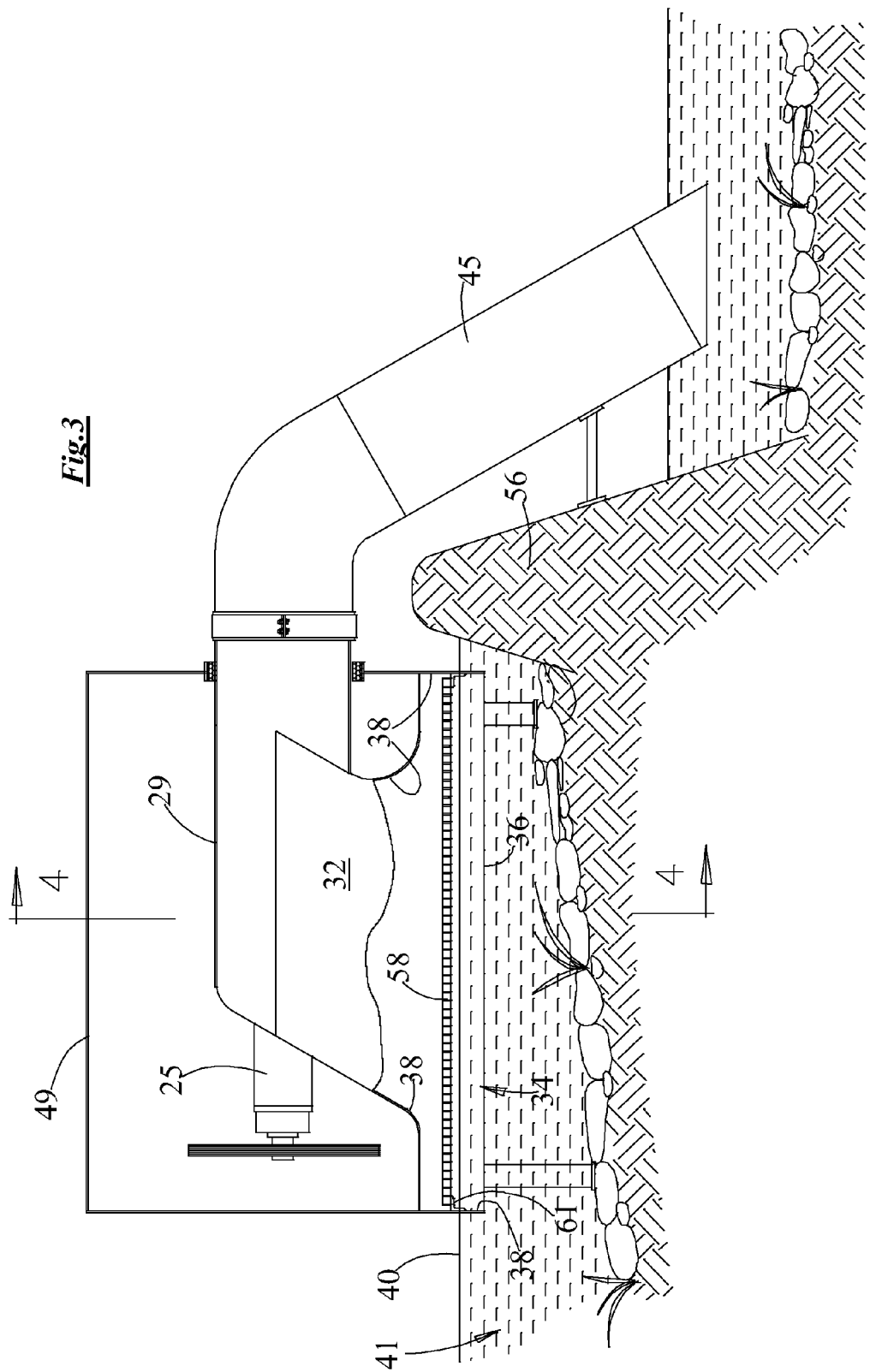
FIG. 3 is a sectioned side-elevation of another hydro-electric plant, shown in association with a headpond and tailpond.

The example of a siphonic hydro-electric power plant installation 20 shown in FIGS. 1,2 is rated at one hundred kilowatts, and is powered by a water flowrate of 2.6 cubic meters per second, on a hydraulic head of three meters.

The installation 20 includes a generator 21, which is belt-driven from a turbine-shaft 23. The shaft 23 runs in journal-bearings housed in an inner-tube 25, which is concentric with an outer-tube 27. The inner- and outer-tubes 25,27 define an annular water-conduit 29, through which water enters turbine-blades mounted on a rotor 30 carried on the shaft 23. The annular water-conduit 29 is part of a water intake-tube 32 of the turbine apparatus.

At the upstream end of the water intake-tube 32, the intake-tube terminates in an intake-mouth 34. The upstream extremities of the tube-wall 38 of the intake-tube 32 form a lip or perimeter 36 of the intake-mouth 34.

The lip or perimeter 36 of the intake-mouth 34 is positioned below the level of the surface 40 (FIGS. 3,4) of the water in a headpond 41 of the installation 20. The lip or perimeter 36 forms a complete encirclement. The designers' intent is that once any drop of water enters the intake-mouth 34, from the headpond 41, that drop cannot go anywhere but through the turbine blades; equally, the designers should see to it that no air is drawn into the intake-tube 32, along with the water from the headpond, during operation of the turbine.

The installation 20 being siphonic, a vacuum pump 43 is provided for providing the initial evacuation of the intake-tube 32, and of the exit-tube 45, in order to create the siphon effect. The vacuum in the intake-tube being established, the intake-tube now fills with water drawn up from the headpond 41, through the intake-mouth 34, and that water starts flowing through the turbine.

When there is no vacuum in the intake-tube 32, no water flows through the turbine. Thus, the operators start the turbine by activating the vacuum pump 43. Similarly, the operators can stop the turbine by allowing air to enter the intake-tube 32, e.g by activating an air-admittance valve 47. (The generator 21 should be disconnected electrically from the mains if the turbine stops, but this can easily be done automatically.)

One of the benefits of a siphonic type of turbine installation is that a (costly) cut-off-valve does not need to be provided in the intake-tube 32, for the purposes of blocking the through-flow of water, e.g during servicing of the installation.

The generator 21 rotates faster than the turbine-shaft 23, as may be understood from FIG. 2. The generator 21 is designed to be coupled to, and synchronized with, the local electrical-grid, whereby the generator, and thus also the shaft 23, are forced to rotate at constant speeds as determined by AC frequency.

The components of the turbine are contained inside a house 49. The house 49 is set down in the headpond 41. The house is provided with stilts 50, which are movable up/down in respective stilt-guides 52, and which, once the height of the house 49 is set, can be locked in their guides.

The stilts 50 engage the bed of the headpond. Jacking brackets 54 are provided on the walls of the house 49, against which a jack can be used to lower the stilts 50 relative to the house walls. After installation on-site, the movable stilts can still be useful, e.g for raising the turbine house out of the water, to facilitate inspection and repair of the trashrack.

Figure 4:
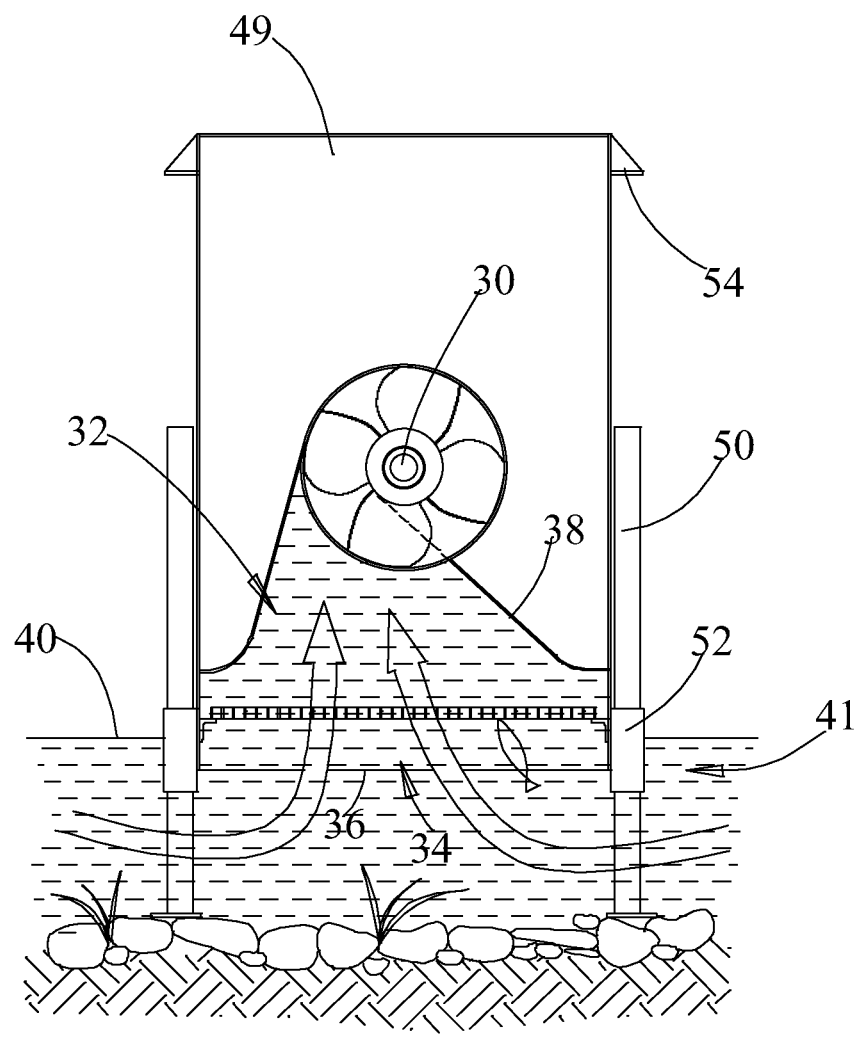
FIG. 4 is a view on line 4-4 of FIG. 3.

As shown in FIGS. 3,4, the bed of the headpond is natural, and the feet of the stilts 50 simply rest on the material of the bed. Sometimes, virtually no civil engineering work is required at the site, if there happen to be suitable natural pools that can serve as the headpond and the tailpond, and also sometimes it is not necessary even to install a dam. Generally, though, as shown in FIG. 3, it will be necessary to engineer a dam 56.

A major benefit of the installation as described herein is that the headpond need only be shallow, which enables the cost of the dam to be kept low. A pool-depth of 1.5 meters, in the headpond, is usually ample, in the present technology, and the technology can even be used with a headpond depth of less than one meter.

The dam 56 can therefore be at the very low end, costs-wise, compared with the general run of dams for hydro-electric stations.

Often, apart from the dam, the headpond requires no work at all—although, of course, the designers might desire e.g to concrete the bed of the headpond. The general point is that, in an installation that accords with the technology as described herein, the needed civil engineering work can be at a minimum.

The intent is that the house 49, and all the components therein, as depicted, can be constructed, and finished, in-factory. The components are mounted robustly in the house, with as much bracing as desired to ensure solidity. All adjustments needed for smooth running of the turbine can be made and tested in-factory, whereby the power plant can be ready to start very soon after being installed on-site.

The house assembly is so constructed that it can be picked up, as a unit, with the finished components inside, by the use of a simple hoist or crane, and lifted onto a truck for shipping to the site of the installation. The house assembly unit can be reliably robust, and can be expected to survive the truck-journey to the site, despite the often-modest quality of road at the site.

Installation at the site is a simple matter of lifting the house assembly off the truck and into the headpond. The operators then use stilt-jacks to set the house assembly to its proper height in the headpond, and to ensure the assembly is properly levelled, etc. Then it only remains to connect up the exit-tube 45, and make the electrical connections, and the installation is ready, right away, to generate power. The need for skilled installation engineers at the site is minimized or eliminated.

A trashrack 58 is provided in the intake-tube 32, near the intake-mouth 34. The trashrack 58 serves to prevent debris, and especially floating debris such as branches of trees and the like, from entering the intake-tube. The trashrack is mounted on rack-support-brackets 61 fixed to the tube-wall 38 of the intake-tube 32, a small distance (designated DT centimeters) upstream of the lip or perimeter 36 of the intake-mouth 34.

Preferably, the brackets 61 include clips to secure the trashrack 58 from rising upwards in the intake-tube 32. Alternatively, the trashrack can be assembled to the brackets upwards from underneath the house, in which case clips would be provided to secure the trashrack against falling downwards.

As will be understood from the drawings, in the example the lip or perimeter 36 of the intake-mouth 34 is constituted by the lower extremities of the house-walls. That is to say: the upstream portions of the tube-wall 38 of the intake-tube 32 are actually formed from the walls of the house 49.

The trashrack 58 comprises a series of bars 60, arranged in a grid or grill. The spacing of the bars is important, in that the bars should be far enough apart that the impedance of the trashrack to water passing through is minimized. However, the spacing of the bars should not be so wide that large pieces of debris can reach the turbine rotor 30, and perhaps damage the blades.

The turbine rotor blades are of such configuration and spacing that a sphere having a diameter greater than D-blades centimeters cannot pass between the blades. The designers should see to it that, in turn, the spacing of the bars of the grill is such that there exists no water-conveying space between the bars of the grill that is wider than D-blades cm. They should also see to it that the grill, thus supported, is so extensive, with respect to the tube-wall, that there exists no water-conveying space between the grill and the tube-wall that is wider than D-blades cm. Besides floating debris, fish that are so large that they would be damaged by passing through the turbine blades are prevented from entering the intake-tube by the grill of bars.

In the example, the house 49 is rectangular, being 1.80 by 3.56 meters. Thus, the water-conveying-area of the intake-mouth 34, being WCA-mouth sq. m, is 6.41 square meters.

The bars 60 are rectangular—in the example they are 8×38 mm—and preferably rounded to minimize hydrodynamic impedance. The bars are pitched some four cm apart, whereby, in the example, the water-conveying area WCA-trashrack, which is available for water passage through the trashrack, is 5.32 sq. m.

In FIG. 3, the intake-tube 32 has not (yet) been evacuated, and the water in the headpond is resting at its natural surface level 40. It can be seen that, at this time, the trashrack 58 is out of the water. That is to say, the surface level 40 in the headpond 41 lies part-way between the trashrack 58 and the lip or perimeter 36 of the intake-mouth 34.

The distance DT, by which the trashrack is upstream of the intake-mouth, should be large enough to ensure this condition, even though the depth of water in the headpond might vary between a high- and low-water condition. Again, the trashrack 58 should not be mounted right at the intake-mouth 34 of the intake-tube 32, but rather should be mounted upstream of the intake-mouth by the distance DT cm. In the example, DT is twenty-five cm.

One benefit of mounting the trashrack 58 out of the water is that, when the air-admittance valve 47 is activated, and the vacuum inside the intake-tube is lost, the water present in the turbine will fall out. Some will fall out through the exit-tube 45, but a good deal will fall out, i.e will fall back, through the intake-tube 32. This sudden surge of reverse-flowing water through the trashrack will very likely have the effect of dislodging any pieces of debris that might have become snagged in the trashrack bars 60. Thus, it may be regarded that, because it is above the water level in the headpond, inside the intake-tube, the trashrack 58 is self-cleaning.

Other considerations that arise from the fact that the trashrack is disposed horizontally, under the turbine house, and is located above the headpond water-level, may be described as follows.

The heat generated in the turbine house can be directed to the trashracks to keep them ice free in cold climates.

The noise and vibrations generated in the turbine house will act to repel fish from the trashrack area.

Additional trash and debris will fall off the trashracks after it has been exposed to air, i.e wet trash left adhering to the bars will tend to fall clear as it dries.

The trashrack being out of the water during periods of shut-down of the station, the likelihood of marine growth accumulating on the bars is minimized.

In the example, the outer-tube 27 has a diameter of ninety centimeters, and the inner-tube of eight cm. Thus, the annular water-conduit 29 defines a through-the-turbine water-conveying area WCA-turbine of 0.63 square meters. In the example, the volumetric flowrate of water through the turbine blades is 2.6 cu. m per second, and the axial component of velocity of that flow is 4.3 m/sec. The shaft 23 rotates at 300 rpm. A rotational velocity of 7.5 rpm is imparted onto the water flow into the turbine; the water emerges from the turbine with zero rotational velocity.

Of course, the volumetric flowrate of water through the turbine blades, being 2.6 cu. m/sec, is the same as the volumetric flowrate of water through the trashrack 58, and through the intake-tube 32—and through the exit-tube 45. The (longitudinal) velocity of the flow in a particular conduit is determined by the water-conveying area of that conduit. The axial velocity of the water passing though the turbine is 4.3 m/sec, and the velocity of water through the trashrack can be expected to be 0.47 m/sec. At such velocity, floating debris that reaches the trashrack can be expected to be pinned quite tightly against the bars, by the current. Upon releasing the vacuum, the velocity of the sudden reverse down-flow through the trashrack can be expected to be of the same order as the up-flow, whereby a piece of debris would have to be tightly jammed indeed, in order not to be released.

Preferably, the velocity through the trashrack should be low, which means that the area WCA-trashrack should be large. In the example, the ratio of WCA-trashrack to WCA-turbine is around 9:1. If the ratio of the areas were less than 5:1, the high water-velocity through the trashrack would likely mean that enough debris would be pinned hard against the bars, by the current, to significantly impede water flow through the trashrack. Also, the firmness with which the debris might then become wedged into the bars might mean that a reversal of flow, upon breaking the vacuum, would not be effective to clear the trashrack.

It is important, also, that the area underneath the house 49, or rather underneath the intake-mouth 34, be clear and free of obstructions that might interfere with the free access of water into the intake-mouth. This aspect may be considered as follows.

Figure 6:
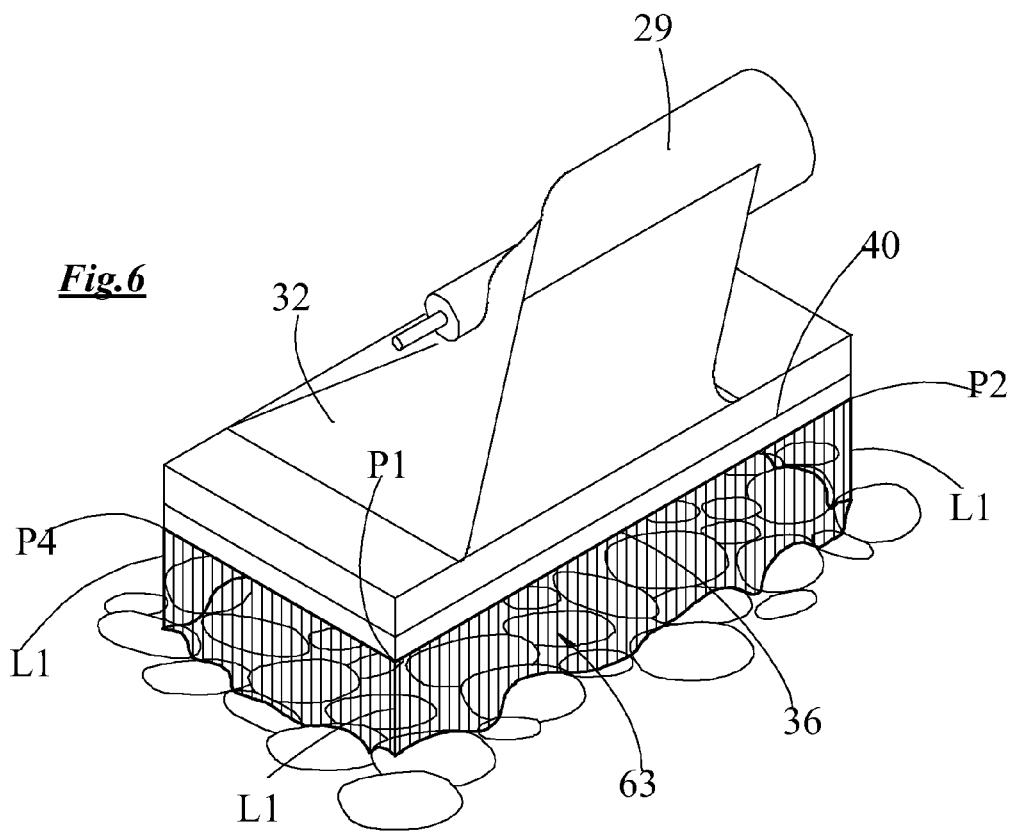
FIG. 6 is a pictorial view, showing the disposition of an intake-catchment-area of a turbine apparatus.

FIG. 6 shows the house 49 installed in a headpond. The downstream extremities of the intake-tube, which define the lip or perimeter of the intake-mouth, are, in the example, the bottom edges of the house-walls of the house. The lip or perimeter of the intake-mouth can be divided up into a series of points, these points being named P1, P2, . . . , etc. Every point P1, P2, . . . , etc on the lip of the intake-mouth lies underwater, below the level of the water-surface 40 in the headpond. (If any point were to lie above the water-surface, air would enter the intake-tube 32, and that air would accumulate until it affected the vacuum draw of the siphon. This is not to say, however, in some cases, that some slight leakage cannot be tolerated.) Three of the points P1,P2,P4 are indicated in FIG. 6, at the corners of the house-walls.

FIG. 6 shows respective lines L1, L2, . . . , etc drawn from the points P1, P2, . . . , etc vertically down to the bed of the headpond. In some installations, it might be the case that the lengths of the lines L1, L2, . . . , etc are all the same; but generally, the lengths of the lines L1, L2, . . . , etc are not all the same, because the bed of the headpond is not flat and smooth.

Also, in some installations, it can be the case that the points P1, P2, . . . , etc that define the lip of the intake-mouth 34 are not all at the same depth below the surface 40 of the headpond.

Figure 7:
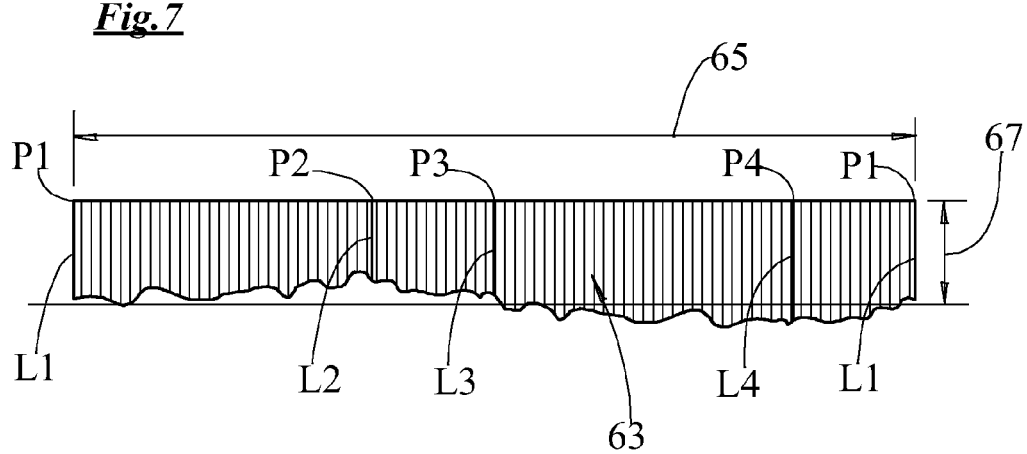
FIG. 7 is a theoretical view of the intake-catchment-area, when opened out and laid flat.

FIG. 7 is a theoretical diagram that shows the lip or perimeter 36 of the intake-mouth opened out and laid flat. The lines L1, L2, . . . , etc extend from the points P1, P2, . . . , etc on the lip 36, vertically down to the corresponding points on the bed of the headpond.

The integral or aggregate of the lines L1, L2, . . . , etc forms an area, termed the intake-catchment-area, in the water underneath the lip or perimeter of the intake-mouth. The water intake-catchment-area 63 is a skirt that extends vertically downwards from the intake-mouth to the bed of the headpond. The intake-catchment-area 63 defines a water-conveying-area, termed WCA-catchment, which is computed as the product of the length of the perimeter of the intake-catchment-area and its average depth. The perimeter of the intake-catchment-area equals the perimeter of the intake-mouth (which is 10.72 meters in the example). This length is indicated, in FIG. 7 by the numeral 65. Its average depth is indicated, in FIG. 7, by the numeral 67. In the example, the average depth of the intake-catchment-area is 0.7 m. Thus, in the example, the magnitude of the intake-catchment-area is 7.5 sq. m. (To be clear: the intake-catchment-area does not exist as physical structure: rather, it is a particular area of water in the headpond.)

Preferably, the water-conveying-area (WCA-catchment sq. m) of the intake-catchment-area, is equal to or greater than the water-conveying-area (WCA-mouth sq. m) of the intake-mouth, and preferably is greater than the water-conveying-area of the trashrack (WCA-trashrack). Preferably also, WCA-catchment sq. m is equal to or greater than five times WCA-turbine sq. m.

Preferably, the intake-catchment-area 63 is between 1.5 m and 0.3 meters deep, at every point P1, P2, . . . , etc. Less than 0.3 meters deep, and the water in the headpond is just too shallow to enable suction of the water out of the headpond to be done economically. If the headpond were more than 1.5 m deep, it is likely that other hydraulic arrangements would be more efficacious or more economical than the technology described herein.

However, it is not required that the said depth limitations apply to every single line of the intake-catchment-area 63. Preferably the house 49 should be well-spaced away from the wall of the dam 56, but if it is close to the dam, the portion of the headpond under the near part of the intake-mouth might be very shallow. But still, the economics of the situation might dictate that such placement is preferable to the expense of excavating the bed of the headpond.

A guideline, when the bed of the headpond is uneven, as to whether (parts of) the bed of the headpond need to be lowered, may be expressed as follows:

in respect of at least eighty-percent of all the points P1, P2, . . . , etc on the lip or perimeter of the intake-mouth, the points P1, P2, . . . , etc should be spaced from the respective nearest points on the bed of the headpond by respective distances D1, D2, . . . , etc of less than 1.5 m; and in respect of at least fifty-percent of all the points P1, P2, . . . , etc on the perimeter of the intake-mouth, the points P1, P2, . . . , etc should be spaced from the respective nearest points on the bed of the headpond by respective distances D1, D2, . . . , etc of more than 0.3 meters.

It should be noted that these guidelines are expressed on the basis of the distance from the point on the lip of the intake-mouth to the nearest point on the bed of the headpond. That nearest point might not be vertically below the point on the lip, but might lie at an angle to one side.

As mentioned, a rotational or angular velocity of 7.5 rpm is imposed on the water, just before it enters the turbine blades. In FIGS. 1-4, such rotation is induced by configuring the intake-tube as a helical spiral. This arrangement is described in detail in patent publications U.S. Pat. Nos. 7,794,196 and 4,465,430, to which attention is directed.

Figure 5:
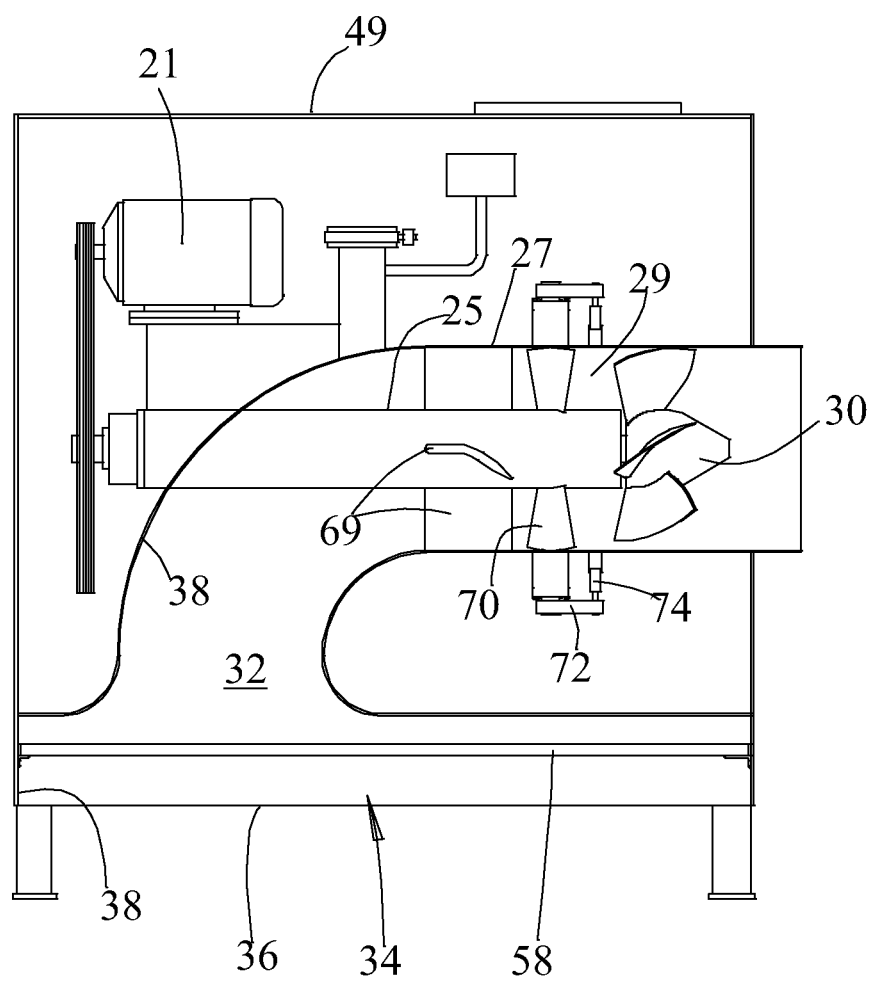
FIG. 5 is a sectioned side-elevation of a further hydro-electric plant.

Alternatively, as shown in FIG. 5, the desired rotational velocity can be induced by passing the water through appropriately configured vanes. The vanes 70 are fixed between the inner and outer diameters 25,27. The vanes 72 are movable, and can be adjusted to enable changes to be made to the angle of orientation of the vanes, and thus to the rpm of the water. (The helical scroll-case arrangement of FIGS. 1-4 does not permit changes to be made to the rpm of the water.) The movable vanes have respective levers 72 by which their orientations can be changed, and the levers are moved, in unison, by activating a ring 74.

Siphonic hydro-electric stations can be plagued with problems due to air bubbles. Generally, the air entering the system contains dissolved air and some entrained air bubbles. As the pressure of the water falls, due to the water being raised by the siphon action, this air tends to bubble out of the water, and the bubbles accumulate at the highest point. The accumulated volume of air can cause inefficiencies and other disadvantages. In some siphonic installations, it has been necessary to keep the vacuum pump running all the time, to prevent air accumulation.

Air accumulation is not so much of a problem in the systems described herein. The turbine is placed at the highest point in the siphon loop, where the air tends to accumulate. This is the place where the water velocity is greatest, whereby the air bubbles tend not to be able to coalesce and form larger bubbles, which would float up to the highest point. Passing through the turbine tends to break up the air into tiny bubbles. The tiny bubbles are carried downwards inside the exit-tube, and coalescence in the exit-tube is kept to a minimum because the bubbles are tiny, and because the water is moving vigorously.

The advantages that arise from placing the turbine at or near the highest point of the siphon loop, may be summarized as follows.

- Placing the turbine high in the siphon loop requires that the turbine be cavitation-resistant since cavitation is a function of the degree of suction at the discharge of the turbine blades. The turbine must be a low velocity design as the velocity of the water discharging from the turbine acts to increase the suction at the discharge of the turbine blades.
- The intake-tube empties completely when the vacuum is released, whereby access to the turbine for maintenance and repairs is facilitated.
- The turbine components are not subject to corrosion and the build-up of marine life if the station is shutdown for an extended period.
- The bearings for the turbine-shaft are subjected to suction, tending to draw air into the intake-tube—in water turbines generally, usually the water is under pressure—which simplifies sealing the bearings against the passing water.

In the present technology, a low-velocity design of axial flow (propeller-type) water turbine is employed. (For present purposes, a low-velocity turbine is one where the tip speed of the blades in relation to the velocity of the water at the entrance to the blades is less than 1:2. The advantages that arise from employing a low-velocity turbine design include:

- A low-velocity axial flow turbine has a high cavitation resistance.
- At low heads, a low-velocity turbine has little or no impact on fish passing through the turbine, due to the low fish to blade relative velocity.
- Low-velocity turbines have the turbine's blades leading edges near parallel to the axis of rotation resulting in large passages between the blades, which again favours fish survival.
- Low-velocity turbines minimize mechanical stresses on the turbine components.
- Low-velocity turbines allow a smaller (less costly) exit-tube to be used as these turbines have a much reduced unit flow rate. The water exiting the turbine exits at a relatively low velocity, which means a high energy recovery.

Some of the physical features of the apparatuses depicted herein have been depicted in just one apparatus. That is to say, not all options have been depicted of all the variants. Skilled designers should understand the intent that depicted features can be included or substituted optionally in others of the depicted apparatuses, where that is possible.

Terms used herein, such as "flat", "equal", and the like, which define respective theoretical constructs, are intended to be construed according to the purposive construction.

The scope of the patent protection sought herein is defined by the accompanying claims. The apparatuses and procedures shown in the accompanying drawings and described herein are examples.

Some of the parameters that have been given special names herein are summarized as:

WCA-turbine=water conveying area of the intake-tube, just upstream of turbine. Dimension in the example is 0.63 sq. m.

WCA-mouth=water conveying area of the mouth of the intake-tube. Dimension in the example is 6.4 sq. m.

WCA-trashrack=water conveying area of the spaces between the bars of the trashrack. Dimension in the example is 5.32 sq. m.

WCA-catchment=water-conveying-area of the intake-catchment-area. Dimension in the example is 7.5 sq. m P1, P2, . . . , etc are points on the lip or perimeter of the intake-mouth.

L1, L2, . . . , etc are vertical lengths from the points P1, P2, . . . , etc to the bed of the headpond.

D1, D2, . . . , etc are the distances from the points P1, P2, . . . , etc to the nearest points on the bed of the headpond.

The numerals that appear in the accompanying drawings are summarized as follows:

20 hydro-electric power-plant
21 generator
23 turbine-shaft
25 inner-tube of 29
27 outer-tube of 29
29 annular water conduit portion of 32
30 turbine rotor
32 water intake-tube
34 intake-mouth of 32
36 lip or perimeter of 34
38 tube-wall of 32
40 surface of water in headpond
41 headpond
43 vacuum pump
45 exit-tube, downstream of turbine
47 air-admittance valve
49 house
50 height-adjustable stilts
52 stilt-guides
54 jacking pads
56 engineered dam
58 trashrack
60 bars, arranged to form a grill of 58

61 trashrack support brackets
63 water intake-catchment-area
65 length of perimeter of intake-catchment-area
67 average depth of intake-catchment-area
69 fixed vanes
70 movable vanes
72 vane-moving levers
74 vane orientation ring

The invention claimed is:

1. Water turbine apparatus including a water-turbine having a rotor with blades for extracting energy from a flowing waterway, in combination with such waterway, wherein:
the waterway includes a headpond and a tailpond, having respective surface-levels, the headpond surface-level being higher than the tailpond surface-level by a hydraulic head of 1.5 m or more;
the apparatus is operable:
(a) to raise water from the headpond, through an intake-tube, by siphon action;
(b) to convey the water to and through the blades of the water-turbine;
(c) and to convey the water from the turbine, through an outlet-tube, to the tailpond;
the intake-tube is enclosed by a tube-wall;
the intake-tube has an open intake-mouth, through which water from the headpond enters the intake-tube;
the intake-mouth has a lip or perimeter, which:
(a) is defined by the upstream extremity of the tube-wall;
(b) is continuous and uninterrupted around the intake-mouth;
substantially every point P1, P2, . . . , etc on the lip or perimeter of the intake-mouth lies underwater, below the level of the water-surface in the headpond;
the apparatus includes a trashrack, which includes a grill of spaced-apart bars;
the bars are so sturdy, and are so spaced, as to inhibit or prevent water-borne trash from passing through the grill, but to allow water to pass through the intake-tube;
the apparatus includes rack-supports, which are effective to support and retain the grill with respect to the tube-wall, inside the intake-tube, downstream of the intake-mouth; and
the grill, thus supported, is so located, inside the intake-tube, that substantially all of the grill lies above all of the lip or perimeter of the intake-mouth.

2. As in claim 1, wherein the grill, thus supported, is disposed above the surface-level of the water in the headpond.

3. As in claim 1, wherein the grill, thus supported, is disposed at least approximately horizontally, above the surface-level of the headpond.

4. As in claim 1, wherein:
the turbine rotor blades are of such configuration and spacing that a sphere having a diameter greater than D-blades centimeters cannot pass between the blades;
the spacing of the bars of the grill is such that there exists no water-conveying space between the bars of the grill that is wider than D-blades cm; and
the grill, thus supported, is so extensive, with respect to the tube-wall, that there exists no water-conveying space between the grill and the tube-wall that is wider than D-blades cm.

5. As in claim 1, wherein:
the intake-tube has a cross-sectional water-conveying area, just upstream of the turbine-blades, of WCA-turbine square meters;
the spaces between the bars of the grill define a water-conveying area of the trashrack, WCA-trashrack sq. m; and
WCA-trashrack sq. m is equal to five times WCA-turbine sq. m, or is larger.

6. As in claim 1, wherein:
the intake-tube has a cross-sectional water-conveying area, just upstream of the turbine-blades, of WCA-turbine square meters;
in respect of at least eighty-percent of all the points P1, P2, . . . , etc on the lip or perimeter of the intake-mouth, the points P1, P2, . . . , etc are spaced from the respective nearest points on the bed of the headpond by respective distances D1, D2, . . . , etc of less than 1.5 m; and
in respect of at least fifty-percent of all the points P1, P2, . . . , etc on the perimeter of the intake-mouth, the points P1, P2, . . . , etc are spaced from the respective nearest points on the bed of the headpond by respective distances D1, D2, . . . , etc of more than 0.3 meters.

7. As in claim 6, wherein:
from the points P1, P2, . . . , etc on the perimeter of the intake-mouth, respective lines L1, L2, . . . , etc extend vertically downwards through the water in the headpond to the bed of the headpond;
the integral or aggregate of the lines L1, L2, . . . , etc forms an intake-catchment-skirt in the water underneath the perimeter of the intake-mouth, extending vertically downwards from the intake-mouth to the bed of the headpond;
the intake-catchment-skirt defines a water-conveying-area, termed WCA-catchment, which is computed as the product of the perimeter of the intake-catchment-skirt and its average depth;
WCA-catchment sq. m is at least five times WCA-turbine sq. m.

8. As in claim 6, wherein the area WCA-catchment sq. m of the intake-catchment-skirt under the lip or perimeter of the intake-mouth is equal to WCA-trashrack sq. m, or is larger.

9. As in claim 6, wherein:
the lip or perimeter of the intake-mouth has a water-conveying area of WCA-mouth sq. m; and
WCA-mouth sq. m is equal to WCA-trashrack sq. m, or is larger.

10. As in claim 1, wherein:
a portion of the intake-tube, immediately upstream of the turbine-blades, is of an annular configuration, having an outside diameter and an inside diameter equal to the outer and inner diameters of the turbine-blades;
the intake-tube is so configured as to impart a substantial rotational component of velocity onto water flowing through the annular portion of the intake-tube, as it enters the turbine-blades; and
the intake-tube is configured as a helical spiral, which is so arranged as to impart the said rotational velocity.

11. As in claim 1, wherein:
between the trashrack and the intake-mouth, the intake-tube is so structured that there exists no physical obstruction between the intake-mouth and the trashrack;
being an obstruction of such form as would prevent debris dislodged from the rack from falling clear of the intake-mouth and clear of the intake-tube.

12. As in claim 1, wherein:
the apparatus includes a house, inside which the water turbine and the intake-tube are housed, forming a house-assembly-unit;
the water-turbine and the intake-tube are fixed to and robustly supported from walls of the house;

to the extent that the house-assembly-unit is a coherent unitary structure that is capable of being picked up as a unit and placed on a truck for transportation.

13. As in claim 12, wherein the house-assembly-unit includes:
an electrical generator;
an operable vacuum pump, which is effective, when operated, to evacuate the intake-tube, and thus to draw up water from the headpond through the intake-mouth.

14. As in claim 12, wherein:
the apparatus includes stilts, which are structured to rest on the bed of the headpond;
at least one of the stilts is movable in the up/down sense in a stilt-guide, relative to the walls of the house;
the stilts are effective to support the house in the headpond with the walls of the house positioned clear of the bed of the headpond.

15. As in claim 12, wherein:
lower portions of the walls of the house lie below the surface level of the water in the headpond, and form a portion of the tube-wall of the intake-tube;
the lowest extremities of the walls of the house form the water intake-mouth of the intake-tube.

16. As in claim 1, wherein the water turbine is located at the highest point of the siphon, being the point beyond which air in the intake-tube and the exit-tube cannot rise.

17. As in claim 1, wherein the water turbine is configured to be characterizable as a low-velocity turbine, in that the tip-velocity of the blades of the turbine is no more than double the velocity of the water at the entrance to the blades.

* * * * *